(12) United States Patent
Zheng

(10) Patent No.: US 8,964,927 B2
(45) Date of Patent: Feb. 24, 2015

(54) METHOD, DEVICE AND SYSTEM FOR COMMUNICATION BETWEEN DOUBLE CENTRAL PROCESSING UNITS

(71) Applicant: Huawei Device Co., Ltd., Shenzhen (CN)

(72) Inventor: Jianbing Zheng, Shenzhen (CN)

(73) Assignee: Huawei Device Co., Ltd., Shenzhen (CH)

( * ) Notice: Subject to any disclaimer, the term of this patent is extended or adjusted under 35 U.S.C. 154(b) by 0 days.

(21) Appl. No.: 13/655,899

(22) Filed: Oct. 19, 2012

(65) Prior Publication Data

US 2013/0044832 A1    Feb. 21, 2013

Related U.S. Application Data

(63) Continuation of application No. PCT/CN2011/072987, filed on Apr. 19, 2011.

(30) Foreign Application Priority Data

Apr. 21, 2010 (CN) .......................... 2010 1 0158687

(51) Int. Cl.
*H04K 1/10* (2006.01)
*G06F 9/54* (2006.01)

(52) U.S. Cl.
CPC .............. *G06F 9/544* (2013.01); *G06F 9/546* (2013.01); *G06F 9/547* (2013.01)
USPC .......................................... 376/260; 375/260

(58) Field of Classification Search
USPC ................................ 375/260, 259
See application file for complete search history.

(56) References Cited

U.S. PATENT DOCUMENTS 6,891,833 B1 *  5/2005  Caves et al. ................ 370/395.2
2003/0056020 A1  3/2003  Chaudhry et al.
(Continued)

FOREIGN PATENT DOCUMENTS

CN     1864146    * 11/2006
CN   101035343      9/2007
(Continued)

OTHER PUBLICATIONS

International Search Report of PCT/CN2011/072987 mailed Jul. 28, 2011.
(Continued)

*Primary Examiner* — Leila Malek
(74) *Attorney, Agent, or Firm* — Staas & Halsey LLP

(57) ABSTRACT

Embodiments of the present invention provide a method, a device and a system for communication between double central processing units, which relates to the field of mobile communications technologies. An embodiment of the present invention provides a method for communication between double central processing units, where the method includes: receiving, by a baseband function module, a baseband function invocation request message sent by an application function module through a service channel and a virtual channel, where the baseband function invocation request message carries a virtual channel identifier, and the virtual channel identifier corresponds to the virtual channel; and in response to the baseband function invocation request message, returning, by the baseband function module, a baseband function invocation response message to the application function module, where the baseband function invocation response message carries the virtual channel identifier.

17 Claims, 7 Drawing Sheets

(56) References Cited

U.S. PATENT DOCUMENTS

| | | |
|---|---|---|
| 2005/0027824 A1 | 2/2005 | Khawand |
| 2005/0076122 A1 | 4/2005 | Khawand et al. |
| 2005/0091306 A1 | 4/2005 | Khawand et al. |
| 2006/0179145 A1* | 8/2006 | Khawand .................... 709/227 |
| 2009/0111524 A1 | 4/2009 | Basaralu |
| 2009/0191917 A1 | 7/2009 | Zappulla et al. |
| 2009/0216518 A1 | 8/2009 | Errickson et al. |

FOREIGN PATENT DOCUMENTS

| | | |
|---|---|---|
| CN | 101076791 | 11/2007 |
| CN | 101416470 | 4/2009 |
| CN | 101478607 | 7/2009 |
| CN | 101841925 | 9/2010 |
| JP | 2007-500474 | 1/2007 |
| JP | 2007-521584 | 8/2007 |
| WO | 2007-058241 A1 | 5/2007 |
| WO | 2009-065803 A1 | 5/2009 |
| WO | 2010-145122 A1 | 12/2010 |

OTHER PUBLICATIONS

Partial Translation of First Chinese Office Action of Chinese application No. 201010158687.3 mailed Feb. 16, 2012.

PCT Written Opinion of the International Searching Authority mailed on Jul. 28, 2011 in corresponding International Application No. PCT/CN2011/072987.

Japanese Office Action mailed Feb. 18, 2014 in corresponding Japanese Patent Application No. 2013-504111 (4 pages) (3 pages English Translation).

V. Loscri, S. Marano, *A new bi-processor SmartPhone: evaluation of the performance generating GPRS data traffic*, IEEE International Conference on Sensor Networks, Ubiquitous, and Trustworthy Computing, 2006 (SUTC' 2006).

Extended European Search Report dated Aug. 10, 2014 in related European Patent Application No. 11771571.4 (7 pages).

* cited by examiner

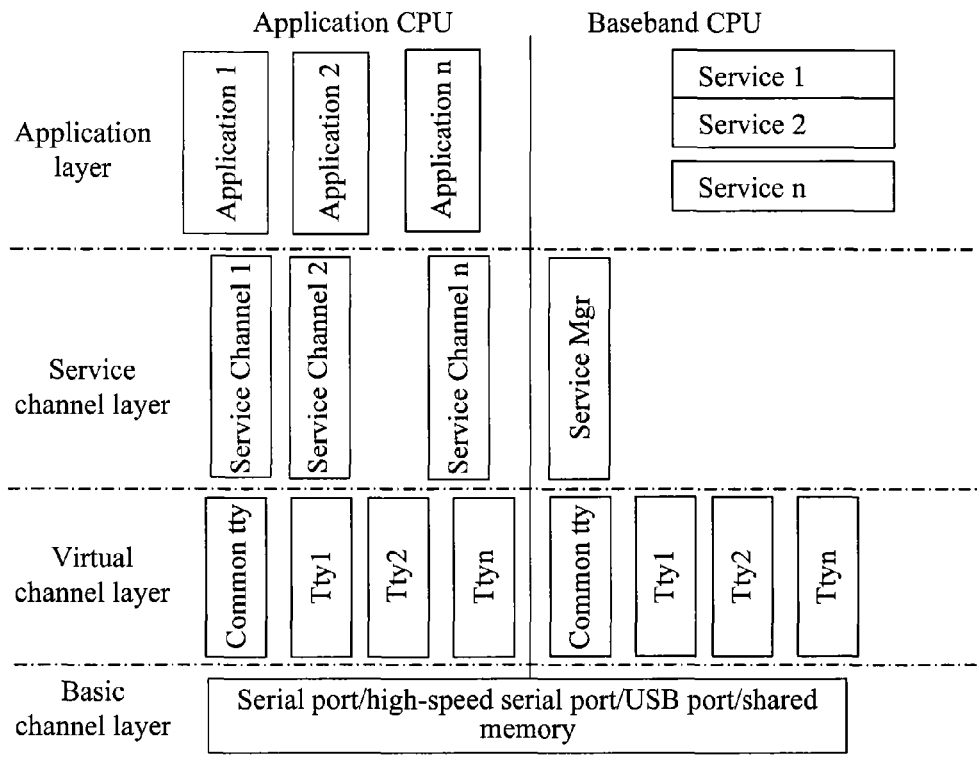

A baseband function module receives a baseband function invocation request message sent by an application function module through a service channel and a virtual channel, where the baseband function invocation request message carries a virtual channel identifier, and the virtual channel identifier corresponds to the virtual channel.   201

In response to the baseband function invocation request message, the baseband function module returns a baseband function invocation response message to the application function module, where the baseband function invocation response message carries the virtual channel identifier.   202

FIG. 2

METHOD, DEVICE AND SYSTEM FOR COMMUNICATION BETWEEN DOUBLE CENTRAL PROCESSING UNITS

CROSS-REFERENCE TO RELATED APPLICATIONS

This application is a continuation of International Application No. PCT/CN2011/072987, filed on Apr. 19, 2011, which claims priority to priority to Chinese Patent Application No. 201010158687.3, filed with the Chinese Patent Office on Apr. 21, 2010 and entitled "METHOD, DEVICE AND SYSTEM FOR COMMUNICATION BETWEEN DOUBLE CENTRAL PROCESSING UNITS", which is incorporated herein by reference in its entirety.

FIELD OF THE INVENTION

The present invention relates to the field of communications technologies, and in particular to a method, a device and a system for communication between double central processing units.

BACKGROUND OF THE INVENTION

At present, a majority of smart phones adopt a double CPU (Central Processing Unit, central processing unit) structure for data processing, where one of the CPUs is a baseband CPU, used for executing basic functions such as a wireless protocol, and the other CPU is an application CPU, used for running application programs and interfaces. Because the functions of the two CPUs are different, multiple application programs running on the application CPU need to invoke the functions of the baseband CPU. In the prior art, communication between the double CPUs is generally performed directly through a serial port/high-speed serial port/USB (Universal Serial Bus, universal serial bus) port/shared memory.

The implementation of the communication between the double CPUs directly through the serial port/high-speed serial port/USB port/shared memory merely solves a problem of a basic communication channel. Due to multiple functions of the baseband CPU and multiple applications of the application CPU, in the running process, a great deal of invocation between the baseband CPU and the application CPU is generated. If the application CPU invokes the functions of the baseband CPU only simply through the serial port/high-speed serial port/USB port/shared memory, a smart phone needs to schedule invocation programs between the baseband CPU and the application CPU through complicated synchronization and mutual exclusion; otherwise, plenty of conflicts occur. On the basis of the communication channel of the serial port/high-speed serial port/USB port/shared memory between the baseband CPU and the application CPU, if each invocation program between the application CPU and the baseband CPU adopts an RPC (Remote Procedure Call Protocol, Remote Procedure Call Protocol) mechanism, a process of communication between the double CPUs is complicated.

SUMMARY OF THE INVENTION

Embodiments of the present invention provide a method, a device and a system for communication between double central processing units, so as to avoid the conflicts in the process of communication between the double CPUs and simplify the communication procedure.

To achieve the above objectives, the embodiments of the present invention adopt the following technical solutions.

An embodiment of the present invention provides a method for communication between double central processing units, where the method includes:

receiving, by a baseband function module, a baseband function invocation request message sent by an application function module through a service channel and a virtual channel, where the baseband function invocation request message carries a virtual channel identifier, and the virtual channel identifier corresponds to the virtual channel; and in response to the baseband function invocation request message, returning, by the baseband function module, a baseband function invocation response message to the application function module, where the baseband function invocation response message carries the virtual channel identifier.

An embodiment of the present invention further provides another method for communication between double central processing units, where the method includes:

sending, by an application function module, a baseband function invocation request message to a baseband function module through a service channel and a virtual channel, where the baseband function invocation request message carries a virtual channel identifier, and the virtual channel identifier corresponds to the virtual channel; and receiving, by the application function module, a baseband function invocation response message returned by the baseband function module, where the baseband function invocation response message corresponds to the baseband function invocation request message.

An embodiment of the present invention provides a device for communication at a baseband central processing unit side, where the device includes: a baseband function module, including a message receiving unit and a response message sending unit.

The message receiving unit is configured to receive a baseband function invocation request message sent by an application function module through a service channel and a virtual channel, where the baseband function invocation request message carries a virtual channel identifier.

The response message sending unit is configured to return a baseband function invocation response message to the application function module in response to the baseband function invocation request message, where the baseband function invocation response message carries the virtual channel identifier.

An embodiment of the present invention provides a device for communication at an application central processing unit side, where the device includes:

an application function module, including a request message sending unit and a message receiving unit.

The request message sending unit is configured to send a baseband function invocation request message to a baseband function module through a service channel and a virtual channel, where the baseband function invocation request message carries a virtual channel identifier, and the virtual channel identifier corresponds to the virtual channel.

The message receiving unit is configured to receive a baseband function invocation response message returned by the baseband function module, where the baseband function invocation response message corresponds to the baseband function invocation request message.

An embodiment of the present invention provides a double central processing unit system, where the system includes: the device for communication at the baseband central processing unit side and the device for communication at the application central processing unit side.

Through the method, the device and the system for communication between the double central processing units provided by the embodiments of the present invention, the baseband function module receives the baseband function invocation request message sent by the application function module through the service channel and the virtual channel, where the baseband function invocation request message carries the virtual channel identifier and the virtual channel identifier corresponds to the virtual channel; and then, the baseband function module returns the baseband function invocation response message to the application function module in response to the baseband function invocation request message, where the baseband function invocation response message carries the virtual channel identifier. Compared with the prior art, the present invention adopts a solution that information interaction between the double central processing units is implemented through the service channel and the virtual channel for mutual communication, thereby avoiding conflicts in the process of communication between the double CPUs and also simplifying complexity of the communication process.

BRIEF DESCRIPTION OF THE DRAWINGS

The accompanying drawings described in the following are provided for further understanding of the present invention as a part of the application, but are not intended to limit the present invention. In the accompanying drawings:

FIG. 1 is a schematic diagram of system layers of a double central processing unit system provided in an embodiment of the present invention;

FIG. 2 is a flow chart of a method for communication between double central processing units provided in an embodiment of the present invention;

DETAILED DESCRIPTION OF THE EMBODIMENTS

Figure 3:
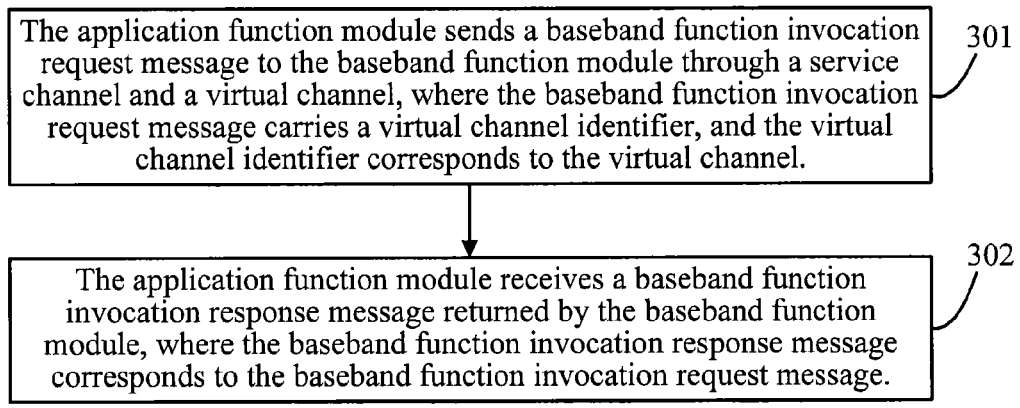
FIG. 3 is a flow chart of another method for communication between double central processing units provided in an embodiment of the present invention.

To make the objectives, technical solutions, and advantages of the present invention clear, the present invention is described in further detail below with reference to embodiments and the accompanying drawings. Here, the exemplary embodiments and description of the embodiments are for illustrating the present invention, but are not intended to limit the present invention.

In an implementation process of the present invention, a method, a device, and a system for communication between double central processing units based on a double CPU system are shown in FIG. 1, where the system mainly includes four layers, namely, a basic channel layer, a virtual channel layer, a service channel layer and an application layer.

The basic channel layer provides original communication channels through a serial port/high-speed serial port/USB port/shared memory.

In the virtual channel layer, multiple virtual parallel channels are generated by adopting a multiplexing mechanism on the basis of the basic channel layer, and may be used at the same time without causing any conflict therebetween. Each virtual channel is an independent channel for the service channel layer, and all the virtual channels share one basic channel layer. When the virtual channels receive data sent by the service channel layer, the virtual channel layer packs the data of each virtual channel, adds a virtual channel identifier to each packet, and then sends the packet to the basic channel. When the virtual channels receive the data packet sent by the basic channel, the virtual channels unpack the data packet received from the basic channel, extract the virtual channel identifiers, and send the data to service channels (Service Channels) on the service channel layer according to the virtual channel identifiers through the virtual channels corresponding to the identifiers.

The service channel layer is formed by the Service Channels and a baseband function management module (Service Mgr). The Service Mgr is responsible for managing each baseband function module (Service) on a baseband CPU, and allocating a virtual channel for each Service Channel. The Service Channel applies for the virtual channel through the Service Mgr, and is connected to one Service on the baseband CPU through the virtual channel. An application program in an application CPU needs to establish only a Service Channel instance and designate a Service to be connected, but does not need to know a virtual channel that the Service Channel is specifically connected to.

The application layer is formed of application function modules (for example, application 1, application 2, . . . , application n) on the application CPU and the Services on the baseband CPU, and the application function modules are connected to the Services through the Service Channels to invoke the Services on the baseband CPU.

FIG. 2 shows a method for communication between double central processing units provided in an embodiment of the present invention. As shown in FIG. 2, the method includes the following steps:

Step 201: A baseband function module receives a baseband function invocation request message sent by an application function module through a service channel and a virtual channel, where the baseband function invocation request message carries a virtual channel identifier, and the virtual channel identifier corresponds to the virtual channel.

Step 202: In response to the baseband function invocation request message, the baseband function module returns a baseband function invocation response message to the application function module, where the baseband function invocation response message carries the virtual channel identifier.

Based on the above embodiment, referring to FIG. 3, a flow chart of another method for communication between double central processing units provided in an embodiment of the present invention is shown. The method includes the following steps:

Step 301: An application function module sends a baseband function invocation request message to a baseband function module through a service channel and a virtual channel, where the baseband function invocation request message carries a virtual channel identifier, and the virtual channel identifier corresponds to the virtual channel.

Step 302: The application function module receives a baseband function invocation response message returned by the baseband function module, where the baseband function invocation response message corresponds to the baseband function invocation request message.

Figure 4:
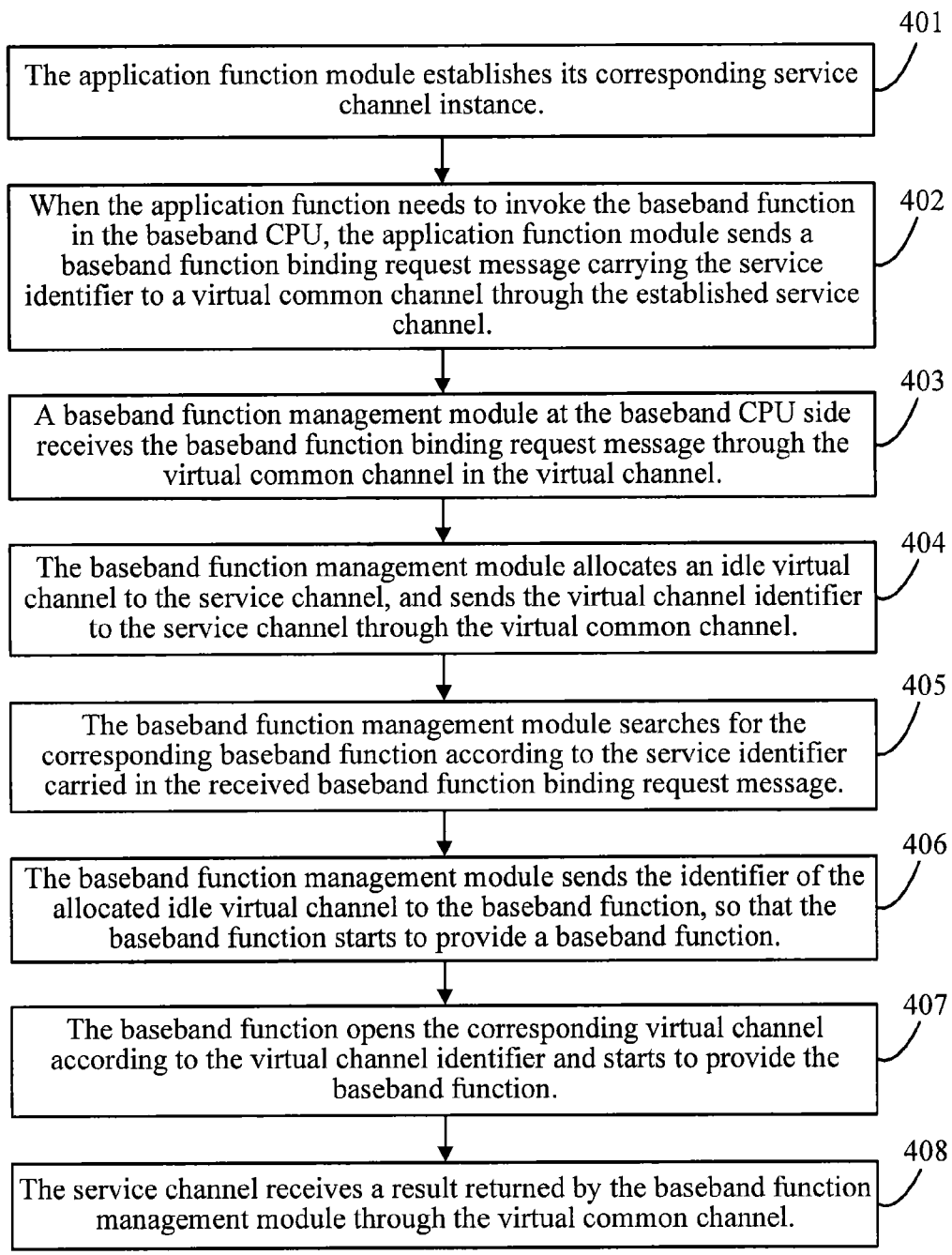
FIG. 4 is a flow chart illustrating establishment of a connection between a Service Channel at an application CPU side and a Service at a baseband CPU side in a method for communication between double central processing units provided in an embodiment of the present invention.

Based on the above embodiment, FIG. 4 shows a process of establishing a connection between a Service Channel at an application CPU side and a Service at a baseband CPU side in the method for communication between the double central processing units provided in an embodiment of the present invention. The specific process is as follows:

Step 401: The application function module establishes service channel Service Channel instance corresponding to the application function module. In other words, when each application program in the application CPU establishes its respective Service Channel instance, and designates a service identifier (Service ID) that the Service Channel instance needs to connect to, where the Service ID is an identifier of the Service at the baseband CPU side. Specifically, the application function module establishes a service channel Service Channel corresponding to the application function module; the service channel obtains its corresponding service identifier Service ID; and the service channel is associated with the service identifier Service ID. For example, if an application function 1 in the application CPU needs to invoke a baseband function 1 in the baseband CPU, where an identifier of the baseband function 1 is Service 1, when establishing a Service Channel 1 for the application function 1, the application CPU associates the Service 1 with the Service Channel 1. The Service ID may be information pre-stored in the application CPU.

Step 402: When the application function needs to invoke a baseband function in the baseband CPU, the application function module sends a baseband function binding request message carrying the Service ID to a virtual common channel (Common tty) through the established Service Channel.

Step 403: A Service Mgr at the baseband CPU side receives the baseband function binding request message through the Common tty in the virtual channel.

Step 404: The Service Mgr allocates an idle virtual channel to the Service Channel, and sends a virtual channel identifier to the Service Channel through the Common tty.

Step 405: The Service Mgr searches for a corresponding Service according to the Service ID carried in the received baseband function binding request message.

Step 406: The Service Mgr sends the identifier of the allocated idle virtual channel to the Service, so that the Service starts to provide a baseband function.

Step 407: The Service opens a corresponding virtual channel according to the virtual channel identifier and starts to provide the baseband function.

Optionally, if a fault occurs in the Service Mgr in any of the above steps, the Service Mgr returns the fault and the reason of the fault reason to the Service and the Service Channel through the Common tty of the virtual channel.

Step 408: The Service Channel receives, through the Common tty, a result returned by the Service Mgr; and if the result returned by the Service Mgr indicates connection success, the Service Channel opens a corresponding virtual channel according to the returned virtual channel identifier, and returns a connection success response to an application function module in the application layer, so that a corresponding application program in the application CPU can perform information interaction with a corresponding Service in the baseband CPU through the Service Channel and the virtual channel. If the Service Channel receives the identifier of the allocated idle virtual channel returned by the Service Mgr through the Common tty in the virtual channel, it may be considered that the connection is successful.

Optionally, if the result returned by the Service Mgr indicates connection failure, the Service Channel returns a connection failure response to the application function module in the application layer.

Figure 5:
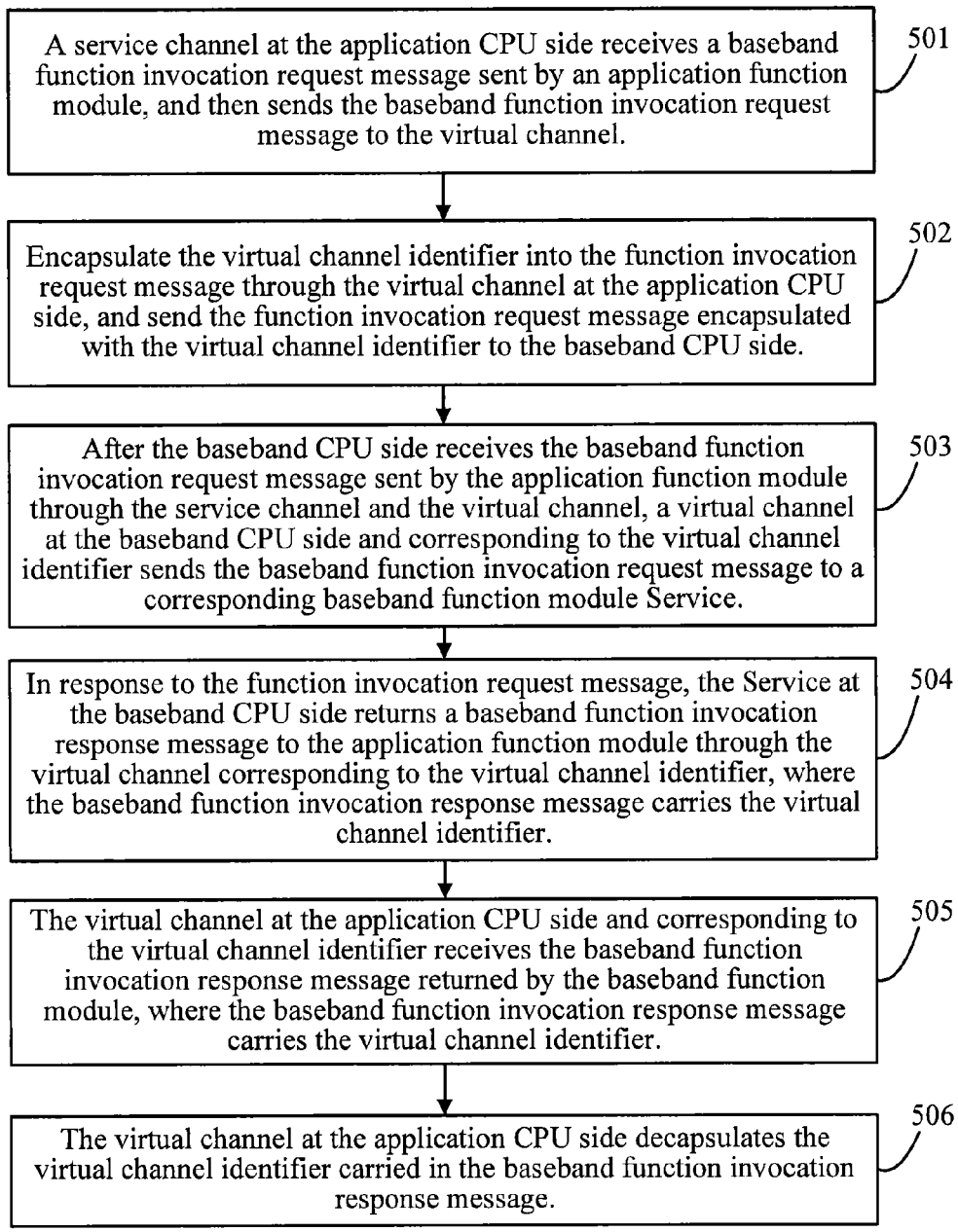
FIG. 5 is a flow chart of a function invoking process between a Service Channel at an application CPU side and a Service at a baseband CPU side in a method for communication between double central processing units provided in an embodiment of the present invention.

Based on the above embodiment, FIG. 5 shows a function invoking process between a Service Channel at an application CPU side and a Service at a baseband CPU side in the method for communication between the double central processing units provided in an embodiment of the present invention, and the specific invoking process includes the following steps.

Step 501: A service channel at the application CPU side receives a baseband function invocation request message sent by an application function module, and then sends the baseband function invocation request message to the virtual channel. When the virtual channel establishes a connection between the Service Channel and the Service, the Service Mgr at the baseband CPU side allocates an idle virtual channel to the Service Channel.

Step 502: Encapsulate a virtual channel identifier into the function invocation request message through the virtual channel at the application CPU side, and send the function invocation request message encapsulated with the virtual channel identifier to the baseband CPU side. Specifically, the virtual channel at the application CPU side encapsulates the function invocation request message sent by the Service Channel with an identifier corresponding to the virtual channel, that is, the virtual channel identifier.

Step 503: After the baseband CPU side receives the baseband function invocation request message sent by the application function module through the service channel and the virtual channel, a virtual channel at the baseband CPU side and corresponding to the virtual channel identifier sends the baseband function invocation request message to a corresponding baseband function module Service.

Step 504: In response to the function invocation request message, the Service at the baseband CPU side returns a baseband function invocation response message to the application function module through the virtual channel corresponding to the virtual channel identifier, where the baseband function invocation response message carries the virtual channel identifier.

It should be noted that, the baseband function invocation response message carries information of a function to be invoked by the Service Channel from the Service.

Step 505: The virtual channel at the application CPU side and corresponding to the virtual channel identifier receives the baseband function invocation response message returned by the baseband function module, where the baseband function invocation response message carries the virtual channel identifier.

Step 506: The virtual channel at the application CPU side decapsulates the virtual channel identifier carried in the baseband function invocation response message, and sends the baseband function invocation response message after being decapsulated to the corresponding application function module through its corresponding Service Channel, thereby completing a process that the application function module invokes functions from the Service through the Service Channel.

Figure 6:
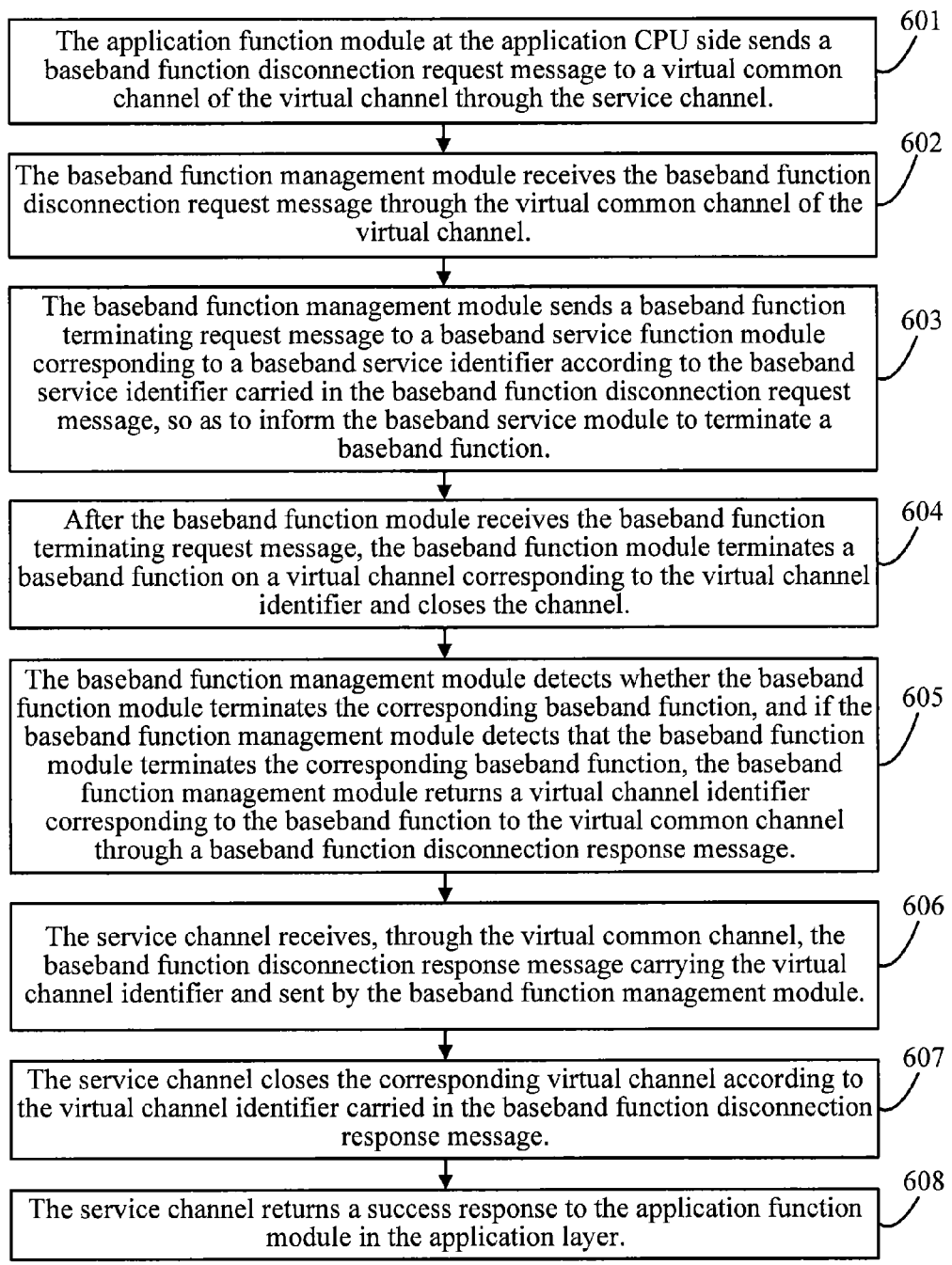
FIG. 6 is a flow chart of a disconnection process between a Service Channel at an application CPU side and a Service at a baseband CPU side in a method for communication between double central processing units provided in an embodiment of the present invention.

Based on the above embodiment, FIG. 6 shows a disconnection process between a Service Channel at an application CPU side and a Service at a baseband CPU side in the method for communication between the double central processing units provided in an embodiment of the present invention, and the specific invoking process includes the following steps:

Step 601: An application function module at the application CPU side sends a baseband function disconnection request message to the Common tty of a virtual channel through the Service Channel, where the baseband function disconnection request message carries a Service ID and a virtual channel identifier.

Step 602: A Service Mgr receives the baseband function disconnection request message through the Common tty of the virtual channel.

Step 603: The Service Mgr sends a baseband function terminating request message to a Service corresponding to the Service ID according to the Service ID carried in the baseband function disconnection request message, so as to inform the Service to terminate a baseband function, where the baseband function terminating request message carries the virtual channel identifier.

Step 604: After the Service receives the baseband function terminating request message, the Service terminates a baseband function on a virtual channel corresponding to the virtual channel identifier and closes the channel.

Step 605: The Service Mgr detects whether the Service terminates the corresponding baseband function, and if the Service Mgr detects that the Service terminates the corresponding baseband function, the Service Mgr returns a virtual channel identifier corresponding to the baseband function to the Common tty through a baseband function disconnection response message, where the virtual channel identifier corresponding to the baseband function is an identifier of a virtual channel to be closed.

Step 606: The Service Channel receives, through the Common tty, the baseband function disconnection response message carrying the virtual channel identifier and sent by the Service Mgr.

Step 607: The Service Channel closes the corresponding virtual channel according to the virtual channel identifier carried in the baseband function disconnection response message.

Step 608: Optionally, the Service Channel returns a success response to the application function module in the application layer.

Figure 7:
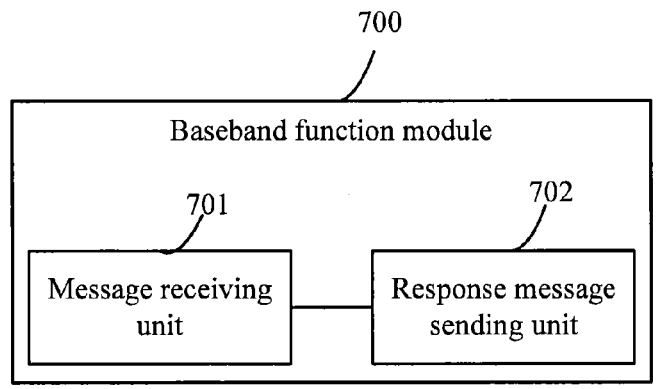
FIG. 7 is a schematic structural diagram of a device for communication at a baseband central processing unit side provided in an embodiment of the present invention.

As shown in FIG. 7, an embodiment of the present invention provides a device for communication at a baseband central processing unit side. The device includes: a baseband function module 700, and the baseband function module 700 includes a message receiving unit 701 and a response message sending unit 702.

The message receiving unit 701 is configured to receive a baseband function invocation request message sent by an application function module through a service channel and a virtual channel, where the baseband function invocation request message carries a virtual channel identifier.

The response message sending unit 702 is configured to return a baseband function invocation response message to the application function module in response to the baseband function invocation request message, where the baseband function invocation response message carries the virtual channel identifier.

Figure 8:
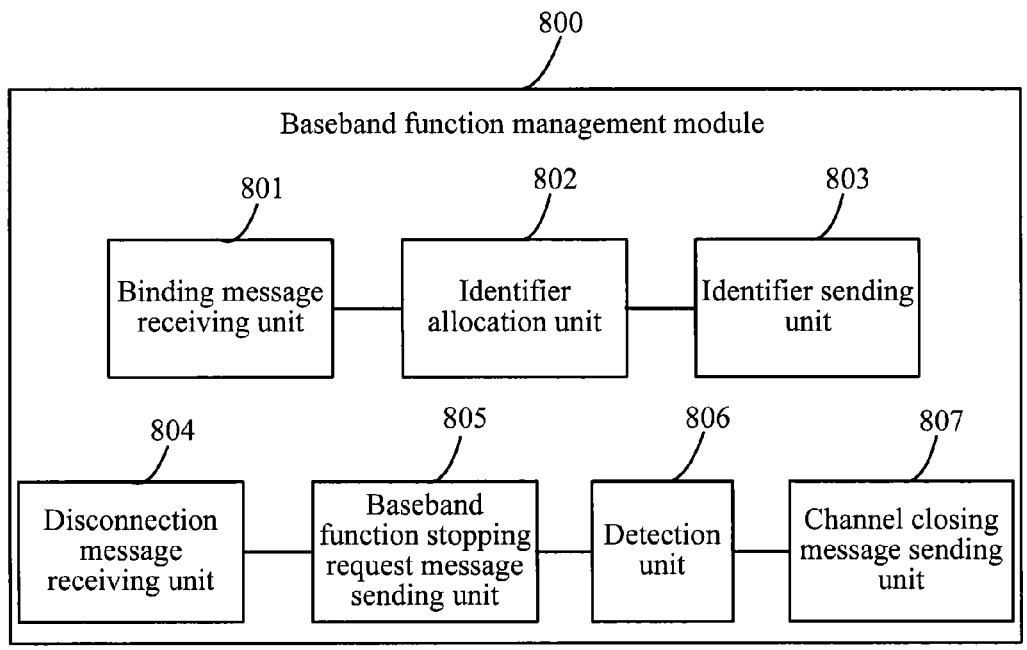
FIG. 8 is a schematic structural diagram of a baseband function management module in a device for communication at a baseband central processing unit side provided in an embodiment of the present invention.

It should be noted that, the device further includes a baseband function management module. As shown in FIG. 8, the baseband function management module 800 includes a binding message receiving unit 801, an identifier allocation unit 802, and an identifier sending unit 803.

The binding message receiving unit 801 is configured to receive a baseband function binding request message sent by an application function module through a service channel and a virtual common channel, where the baseband function binding request message carries a baseband function identifier.

The identifier allocation unit 802 is configured to allocate a virtual channel identifier to the service channel through which the baseband function binding request message is sent.

The identifier sending unit 803 is configured to send the virtual channel identifier to the service channel through the virtual common channel; and/or send the allocated virtual channel identifier to a baseband function module corresponding to the baseband function identifier.

It should be further noted that, the baseband function management module 800 further includes a disconnection message receiving unit 804, a baseband function terminating request message sending unit 805, a detection unit 806, and a channel closing message sending unit 807.

The disconnection message receiving unit 804 is configured to receive a baseband function disconnection request message sent by the application function module through a service channel and a virtual channel, where the baseband function disconnection request message carries a baseband function identifier and a virtual channel identifier corresponding to the virtual channel.

The baseband function terminating request message sending unit 805 is configured to send a baseband function terminating request message to a baseband function module corresponding to the baseband function identifier according to the baseband function identifier, where the baseband function terminating request message carries the virtual channel identifier, so that the baseband function module terminates a baseband function corresponding to the baseband function identifier and closes a virtual channel corresponding to the virtual channel identifier.

The detection unit 806 is configured to detect whether the baseband function module terminates the corresponding baseband function.

The channel closing message sending unit 807 is configured to, if the corresponding baseband function is terminated, return a baseband function disconnection response message to the service channel through the common virtual channel, where the baseband function disconnection response message carries the virtual channel identifier.

Figure 9:
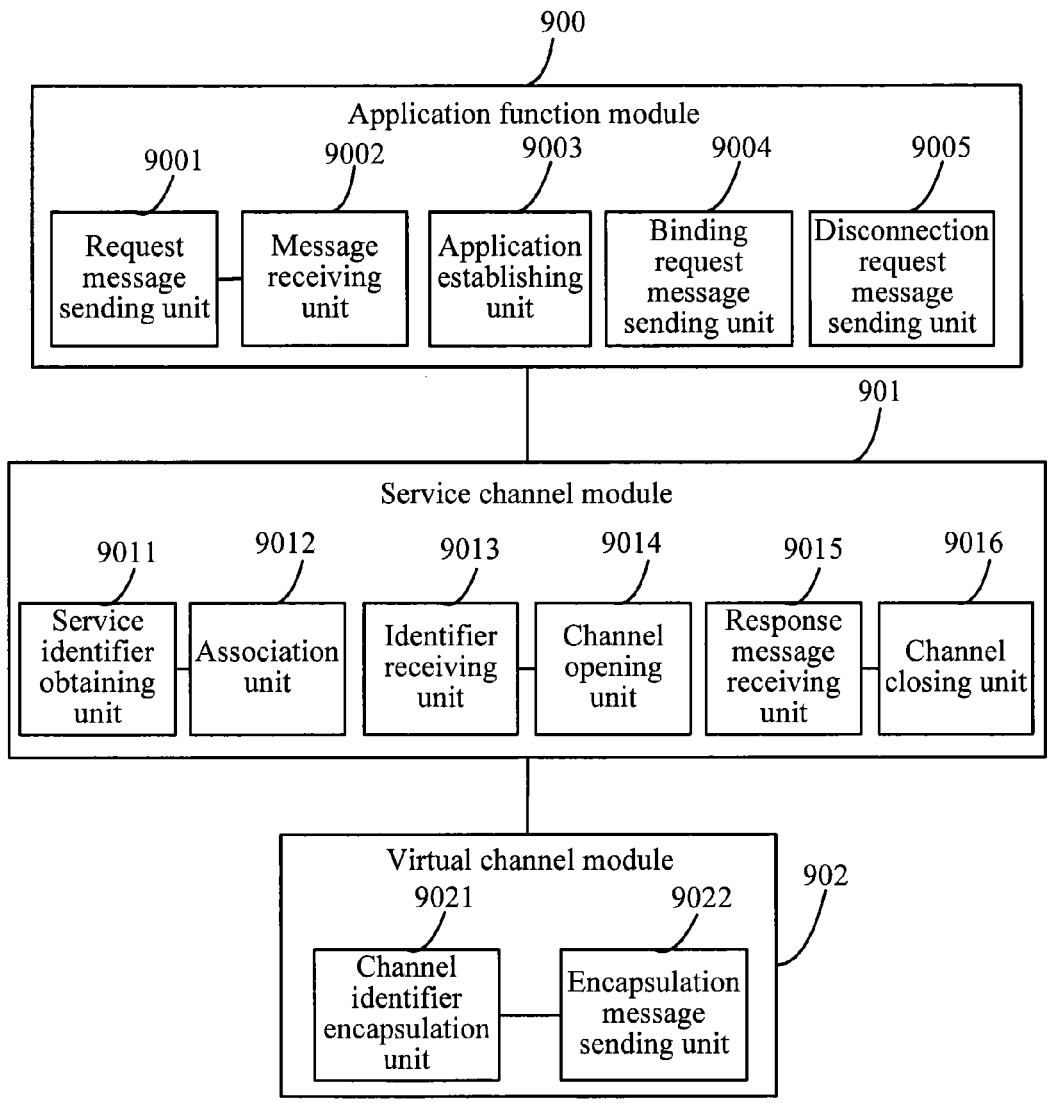
FIG. 9 is a schematic structural diagram of a device for communication at an application central processing unit side provided in an embodiment of the present invention.

As shown in FIG. 9, an embodiment of the present invention provides a device for communication at an application central processing unit side. The device includes: an application function module 900, and the application function module 900 includes a request message sending unit 9001 and a message receiving unit 9002.

The request message sending unit 9001 is configured to send a baseband function invocation request message to a baseband function module through a service channel and a virtual channel, where the baseband function invocation request message carries a virtual channel identifier, and the virtual channel identifier corresponds to the virtual channel.

The message receiving unit 9002 is configured to receive a baseband function invocation response message returned by the baseband function module, where the baseband function invocation response message corresponds to the baseband function invocation request message.

It should be noted that, the device may further include a service channel module 901, and the service channel module 901 includes a service identifier obtaining unit 9011 and an association unit 9012. The application function module 900 further includes an application establishing unit 9003.

The application establishing unit 9003 is configured to establish a service channel corresponding to the application establishing unit 9003.

The service identifier obtaining unit 9011 is configured to obtain a service identifier corresponding to the service identifier obtaining unit 9011.

The association unit 9012 is configured to associate the service channel with the service identifier.

It should be further noted that, the application function module 900 further includes: a binding request message sending unit 9004. The service channel module 901 further includes: an identifier receiving unit 9013 and a channel opening unit 9014.

The binding request message sending unit 9004 is configured to send a baseband function binding request message to the baseband function management module through a service channel and a virtual common channel, where the baseband function binding request message carries a baseband function identifier.

The identifier receiving unit 9013 is configured to receive a virtual channel identifier allocated by the baseband function management module to the service channel through the virtual common channel.

The channel opening unit 9014 is configured to open a virtual channel corresponding to the virtual channel identifier.

It should be further noted that, the device may further include a virtual channel module 902, and the virtual channel module 902 includes a channel identifier encapsulation unit 9021 and an encapsulation message sending unit 9022. The service channel module 901 further includes a response message receiving unit 9015 and a channel closing unit 9016. The application function module 900 further includes a disconnection request message sending unit 9005.

The disconnection request message sending unit 9005 is configured to send a baseband function disconnection request message through a service channel, where the baseband function disconnection request message carries a service identifier.

The channel identifier encapsulation unit 9021 is configured to encapsulate a virtual channel identifier into the baseband function disconnection request message.

The encapsulation message sending unit 9022 is configured to send the baseband function disconnection request message encapsulated with the virtual channel identifier to the baseband management function module.

The response message receiving unit 9015 is configured to receive a baseband function disconnection response message corresponding to the baseband function disconnection request message and sent by the baseband function management module.

The channel closing unit 9016 is configured to close the corresponding service channel according to the service identifier, and optionally return a success response message to the application function module.

Figure 10:
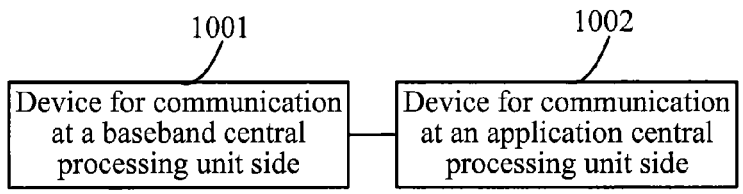
FIG. 10 is a schematic structural diagram of a double central processing unit system provided in an embodiment of the present invention.

As shown in FIG. 10, an embodiment of the present invention provides a double central processing unit system. The system includes: the device for communication at the baseband central processing unit side 1001 and the device for communication at the application central processing unit side 1002.

Through the method, the device, and the system for communication between the double central processing units provided by the embodiments of the present invention, the baseband central processing unit side receives the baseband function invocation request message sent by the application function module through the service channel and the virtual channel, where the baseband function invocation request message carries the virtual channel identifier; and the baseband function module returns the baseband function invocation response message to the application function module in response to the baseband function invocation request message, where the baseband function invocation response message carries the virtual channel identifier. Compared with the prior art, in the communication process between the double central processing units of the present invention, the baseband function management module at the baseband central processing unit side uniformly allocates the virtual channel to the service channel corresponding to each application function module at the application micro processing unit side, and information interaction is performed through the virtual channel. The application micro processing unit is connected to the baseband function module in the baseband central processing unit through the service channel to establish the allocated virtual channel for information interaction, thereby avoiding conflicts generated in the process of communication between the double CPUs, and simplifying complexity of the communication process.

Persons skilled in the art should understand that all or a part of the steps of the method according to the embodiments of the present invention may be implemented by a program instructing relevant hardware. The program may be stored in a computer readable storage medium, such as a ROM, a RAM, a magnetic disk, or an optical disk.

The objectives, technical solutions, and beneficial effects of the present invention have been described in further detail through the above specific embodiments. It should be understood that the above descriptions are merely specific embodiments of the present invention, but not intended to limit the present invention. Any modification, equivalent replacement, or improvement made without departing from the spirit and principle of the present invention shall fall within the protection scope of the present invention.

What is claimed is:

1. A method for communication between double central processing units (CPUs) of an application CPU and a baseband CPU, the application CPU supporting an application function module and the baseband CPU supporting a baseband function module, the method comprising:

establishing a service channel between the application function module at the application CPU and the baseband function module at the baseband CPU, through a virtual channel by:
utilizing a baseband function management module at the baseband CPU to allocate a virtual channel identifier for the virtual channel,
receiving, by the baseband function module, a baseband function invocation request message sent by the application function module through the established service channel for the application function module and the virtual channel, wherein the baseband function invocation request message carries the virtual channel identifier for the virtual channel, and
in response to the baseband function invocation request message, returning, by the baseband function module, a baseband function invocation response message to the application function module, wherein the baseband function invocation response message carries the virtual channel identifier;

receiving, by the baseband function management module, a baseband function binding request message sent by the application function module through the service channel and a virtual common channel, wherein the baseband function binding request message carries a baseband function identifier;

allocating, by the baseband function management module, the virtual channel identifier to the service channel, and sending the virtual channel identifier to the service channel through the virtual common channel; and sending, by the baseband function management module, the allocated virtual channel identifier to a baseband function module corresponding to the baseband function identifier.

2. The method for communication between the double central processing units according to claim 1, further comprising:

opening, by the baseband function module corresponding to the baseband function identifier, the virtual channel corresponding to the allocated virtual channel identifier.

3. The method for communication between the double central processing units according to claim 2, wherein the returning, by the baseband function module, the baseband function invocation response message to the application function module in response to the baseband function invocation request message comprises:

obtaining, by the baseband function module, in response to the baseband function invocation request message, a baseband function invoked through the baseband function invocation request message;

encapsulating, by the baseband function module, the obtained baseband function into the baseband function invocation response message; and returning, by the baseband function module, the baseband function invocation response message to the application function module through the virtual channel.

4. The method for communication between the double central processing units according to claim 1, further comprising:

receiving, by the baseband function management module, a baseband function disconnection request message sent by the application function module through the service channel and the virtual channel, wherein the baseband function disconnection request message carries a baseband function identifier and a virtual channel identifier corresponding to the virtual channel;

sending, by the baseband function management module, a baseband function terminating request message to the baseband function module corresponding to the baseband function identifier according to the baseband function identifier, wherein the baseband function terminating request message carries the virtual channel identifier, so that the baseband function module terminates a baseband function corresponding to the baseband function identifier and closes the virtual channel corresponding to the virtual channel identifier;

detecting, by the baseband function management module, whether the baseband function module terminates the corresponding baseband function; and if the corresponding baseband function is terminated, returning, by the baseband function management module, a baseband function disconnection response message to the service channel through the common virtual channel, wherein the baseband function disconnection response message carries the virtual channel identifier.

5. The method according to claim 1, further comprising:

sending, by the application function module, the baseband function invocation request message to the baseband function module through the service channel for the application function module and the virtual channel; and receiving, by the application function module, the baseband function invocation response message returned by the baseband function module, wherein the baseband function invocation response message corresponds to the baseband function invocation request message sent by the application function module.

6. The method for communication between the double central processing units according to claim 5, wherein the sending, by the application function module, the baseband function invocation request message through the service channel and the virtual channel comprises:

receiving, through the service channel, the baseband function invocation request message sent by the application function module;

sending, through the service channel, the baseband function invocation request message to the virtual channel; and encapsulating the virtual channel identifier into the baseband function invocation request message, and sending, through the virtual channel, the baseband function invocation request message encapsulated with the virtual channel identifier to the baseband function module.

7. The method for communication between the double central processing units according to claim 6, wherein the receiving, by the application function module, the baseband function invocation response message returned by the baseband function module comprises:

receiving, through the virtual channel, the baseband function invocation response message returned by the baseband function module, wherein the baseband function invocation response message carries the virtual channel identifier; and decapsulating the virtual channel identifier carried in the baseband function invocation response message, and sending, through the virtual channel, the decapsulated baseband function invocation response message to the application function module through its corresponding service channel.

8. The method for communication between the double central processing units according to claim 5, further comprising:

establishing, by the application function module, the service channel corresponding to the application function module;

obtaining, through the service channel, a service identifier corresponding to the service channel; and associating the service channel with the service identifier.

9. The method for communication between the double central processing units according to claim 8, wherein before the establishing of the virtual channel, the method further comprises:

sending, by the application function module, a baseband function binding request message to the baseband function management module through the service channel and a virtual common channel, wherein the baseband function binding request message carries a baseband function identifier;

receiving the virtual channel identifier allocated by the baseband function management module to the service channel through the virtual common channel; and opening, through the service channel, the virtual channel corresponding to the virtual channel identifier.

10. The method for communication between the double central processing units according to claim 8, further comprising:
sending, by the application function module, a baseband function disconnection request message through the service channel, wherein the baseband function disconnection request message carries the service identifier;
encapsulating the virtual channel identifier into the baseband function disconnection request message through the virtual channel; and
sending, through the virtual channel, the baseband function disconnection request message encapsulated with the virtual channel identifier to the baseband management function module.

11. The method for communication between the double central processing units according to claim 10, further comprising:
receiving, through the service channel, a baseband function disconnection response message corresponding to the baseband function disconnection request message sent by the baseband function management module; and
according to the service identifier, closing the service channel and returning a success response message to the application function module.

12. A device for communication at a baseband central processing unit (CPU) comprising:
non-transitory computer readable storage medium to store program(s), and
computer hardware configured, including configured by the program(s), to implement modules comprising:
a baseband function module configured to communicate with an application function module at an application central processing unit (CPU) side, wherein the baseband function module comprises a message receiving unit and a response message sending unit; and
a baseband function management module configured to allocate a virtual channel identifier for a virtual channel applied for by the application function module at the application CPU to establish a service channel, through the allocated virtual channel, between the application function module at the application CPU and the baseband function module at the baseband CPU,
the message receiving unit is configured to receive a baseband function invocation request message sent by the application function module through the established service channel for the application function module and the virtual channel, wherein the baseband function invocation request message carries the virtual channel identifier for the virtual channel,
the response message sending unit is configured to return a baseband function invocation response message to the application function module in response to the baseband function invocation request message, wherein the baseband function invocation response message carries the virtual channel identifier, and
the baseband function management module further comprises a binding message receiving unit, an identifier allocation unit, and an identifier sending unit,
the binding message receiving unit is configured to receive a baseband function binding request message sent by the application function module through the service channel and a virtual common channel, wherein the baseband function binding request message carries a baseband function identifier;
the identifier allocation unit is configured to allocate the virtual channel identifier to the service channel through which the baseband function binding request message is sent; and
the identifier sending unit is configured to send the virtual channel identifier to the service channel through the virtual common channel and/or to send the allocated virtual channel identifier to a baseband function module corresponding to the baseband function identifier.

13. The device for communication at the baseband CPU side according to claim 12, wherein the baseband function management module further comprises: a disconnection message receiving unit, a baseband function terminating request message sending unit, a detection unit, and a channel closing message sending unit,
the disconnection message receiving unit is configured to receive a baseband function disconnection request message sent by the application function module through the service channel and the virtual channel, wherein the baseband function disconnection request message carries the baseband function identifier and the virtual channel identifier corresponding to the virtual channel;
the baseband function terminating request message sending unit is configured to send a baseband function terminating request message to the baseband function module corresponding to the baseband function identifier according to the baseband function identifier, wherein the baseband function terminating request message carries the virtual channel identifier, so that the baseband function module terminates the baseband function corresponding to the baseband function identifier and closes the virtual channel corresponding to the virtual channel identifier;
the detection unit is configured to detect whether the baseband function module terminates the corresponding baseband function; and
the channel closing message sending unit is configured to, if the corresponding baseband function is terminated, return a baseband function disconnection response message to the service channel through the common virtual channel, wherein the baseband function disconnection response message carries the virtual channel identifier.

14. The device for communication at the baseband CPU side according to claim 12, wherein the application function module comprises a request message sending unit and a message receiving unit,
the request message sending unit is configured to send the baseband function invocation request message to the baseband function module through the service channel for the application function module and the virtual channel; and
the message receiving unit is configured to receive the baseband function invocation response message returned by the baseband function module, wherein the baseband function invocation response message corresponds to the baseband function invocation request message sent by the application function module.

15. The device for communication at the baseband CPU side according to claim 14, wherein the application CPU side is configured with a service channel module, wherein
the service channel module comprises: a service identifier obtaining unit and an association unit; and
the application function module further comprises: an application establishing unit, the application establishing unit is configured to establish its corresponding service channel;

the service identifier obtaining unit is configured to obtain a service identifier corresponding to the service identifier obtaining unit; and the association unit is configured to associate the service channel with the service identifier.

16. The device for communication at the baseband CPU side according to claim 15, wherein the application function module further comprises: a binding request message sending unit; and the service channel module further comprises: an identifier receiving unit and a channel opening unit, the binding request message sending unit is configured to send a baseband function binding request message to the baseband function management module through the service channel and the virtual common channel, wherein the baseband function binding request message carries the baseband function identifier; and the identifier receiving unit is configured to receive the virtual channel identifier allocated by the baseband function management module to the service channel through the virtual common channel; and the channel opening unit is configured to open the virtual channel corresponding to the virtual channel identifier.

17. The device for communication at the baseband CPU side according to claim 16, wherein the application CPU side is further configured with:

a virtual channel module, wherein the virtual channel module comprises: a channel identifier encapsulation unit and an encapsulation message sending unit;

the service channel module further comprises: a response message receiving unit and a channel closing unit; and the application function module further comprises: a disconnection request message sending unit, the disconnection request message sending unit is configured to send a baseband function disconnection request message through the service channel, wherein the baseband function disconnection request message carries the service identifier;

the channel identifier encapsulation unit is configured to encapsulate a-the virtual channel identifier into the baseband function disconnection request message;

the encapsulation message sending unit is configured to send the baseband function disconnection request message encapsulated with the virtual channel identifier to the baseband management function module;

the response message receiving unit is configured to receive a baseband function disconnection response message corresponding to the baseband function disconnection request message and sent by the baseband function management module; and the channel closing unit is configured to close the corresponding service channel according to the service identifier.

* * * * *